US012698744B2

(12) United States Patent
Holmes

(10) Patent No.: US 12,698,744 B2
(45) Date of Patent: Aug. 4, 2026

(54) VALVE SYSTEM FOR TWO-STROKE ENGINE

(71) Applicant: GM Global Technology Operations LLC, Detroit, MI (US)

(72) Inventor: Alan G. Holmes, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/668,502

(22) Filed: May 20, 2024

(65) Prior Publication Data

US 2025/0354528 A1 Nov. 20, 2025

(51) Int. Cl.

*F02F 3/24* (2006.01)
*F02B 25/02* (2006.01)
*F02B 75/02* (2006.01)

(52) U.S. Cl.

CPC ................ *F02F 3/24* (2013.01); *F02B 25/02* (2013.01); *F02B 75/02* (2013.01); *F02B 2075/025* (2013.01)

(58) Field of Classification Search

CPC ....... F01L 1/182; F01L 3/18; F01L 2001/054; F02B 1/02; F02B 25/08; F02B 31/02; F02B 31/06; F02B 75/28; F02B 75/282; F02D 15/00; F02D 41/3011; F02D 2041/0015; F02D 35/027; Y02T 10/40; Y02T 10/12; Y02T 29/39231; F01F 1/186

See application file for complete search history.

(56) References Cited

U.S. PATENT DOCUMENTS 8,413,619 B2 * 4/2013 Cleeves .................... F01B 7/14 123/48 B
8,544,445 B2 * 10/2013 Cleeves .................. F01L 1/182 123/305
9,194,288 B2 * 11/2015 Cleeves .................. F02F 1/186
9,316,130 B1 * 4/2016 Harmon, Sr. ........... F01L 31/00
2010/0192923 A1 * 8/2010 Cox ........................ F02B 25/08 123/445

(Continued)

FOREIGN PATENT DOCUMENTS

NL 2011947 C2 6/2015
WO 2013185802 A1 12/2013
WO 2015088347 A1 6/2015

*Primary Examiner* — Hai H Huynh
*Assistant Examiner* — Johnny H Hoang
(74) *Attorney, Agent, or Firm* — CANTOR COLBURN LLP

(57) ABSTRACT

A valve system includes a valve member disposed in a cylinder of a two-stroke engine, the valve member disposed between a piston and a sidewall of the cylinder, the cylinder including a combustion chamber and a fluid port formed in the sidewall, the piston configured to move within the cylinder along the cylinder axis during a power cycle between a first position and a second position. The valve member is moveable along the cylinder axis, and the valve member is configured to be moved between an open position and a closed position, wherein the valve member covers the fluid port in the closed position. The valve system also includes an actuator configured to move the valve member in coordination with movement of the piston during a power cycle, so that the valve member is in the closed position as the piston traverses the fluid port.

20 Claims, 10 Drawing Sheets

(56) References Cited

U.S. PATENT DOCUMENTS

| | | | | |
|---|---|---|---|---|
| 2012/0085305 A1* | 4/2012 | Cleeves | .................... | F01L 1/30 123/188.5 |
| 2012/0089316 A1* | 4/2012 | Cleeves | .................... | F01L 5/06 701/102 |
| 2012/0291743 A1* | 11/2012 | Hamby | ................... | F02B 33/10 123/193.1 |
| 2014/0123934 A1* | 5/2014 | Schouweiler, Jr. | ..... | F02B 25/14 123/295 |

* cited by examiner

VALVE SYSTEM FOR TWO-STROKE ENGINE

INTRODUCTION

The subject disclosure relates to the art of engine systems and, more particularly, to a valve system for a two-stroke engine systems.

Two-stroke engines are used in a variety of applications, such as small propulsion devices (e.g., scooters, power tools, etc.). In addition, two-stroke engines may be useful in automotive applications, such as hybrid electric vehicles. Two stroke engines may have spark ignition and operate with fuel gases, gasoline, or other volatile fuels introduced by carburetor, port fuel injection, or direct in-cylinder fuel injection. Alternately, two-stroke engines may have compression ignition and high-pressure direct injection. In a two-stroke engine, a piston travels along a cylinder in compression and expansion/power strokes. The piston includes rings that seal against internal surfaces of the cylinder. Intake and exhaust, known in combination as scavenging, take place during the ending of the expansion stroke and the beginning of the compression stroke. Intake into the cylinder and exhaust from the cylinder take place through ports, valves, or a combination thereof.

SUMMARY

In one exemplary embodiment, a valve system for a two-stroke engine includes a valve member disposed in a cylinder of the two-stroke engine, the cylinder having a cylinder axis, the valve member disposed between a piston and a sidewall of the cylinder, the cylinder including a combustion chamber and a fluid port formed in the sidewall, the fluid port including at least one of an intake port and an exhaust port, the piston configured to move within the cylinder along the cylinder axis during a power cycle between a first position in which a volume of the combustion chamber is at a maximum, and a second position in which the volume of the combustion chamber is at a minimum. The valve member is moveable along the cylinder axis, and the valve member is configured to be moved between an open position and a closed position, wherein the valve member covers the fluid port in the closed position. The valve system also includes an actuator configured to move the valve member in coordination with movement of the piston during a power cycle, so that the valve member is in the closed position as the piston traverses the fluid port.

In addition to one or more of the features described herein, the piston includes a sealing ring configured to provide a fluid seal between the piston and the sidewall.

In addition to one or more of the features described herein, the actuator is configured to move the valve member relative to the piston so that the sealing ring is prevented from engaging a boundary of the fluid port during the power cycle.

In addition to one or more of the features described herein, the valve member is in the open position when the piston is in the first position, and the actuator is configured to move the valve member with the piston as the sealing ring traverses the fluid port, and maintain the valve member in the closed position as the sealing ring moves beyond the fluid port and the piston moves to the second position.

In addition to one or more of the features described herein, the valve member is in the closed position when the piston is in the second position, and the actuator is configured to maintain the valve member in the closed position when the piston commences moving toward the first position, and move the valve member from the closed position toward the open position as the piston approaches the first position and as the sealing ring traverses the fluid port.

In addition to one or more of the features described herein, the valve member is configured as a sleeve extending along a circumference of the cylinder, and the sleeve is configured to cover both the intake port and the exhaust port when the sleeve is in the closed position.

In addition to one or more of the features described herein, the two-stroke engine is disposed in a vehicle and is configured to provide propulsion of the vehicle.

In addition to one or more of the features described herein, the valve member includes a first member configured to cover the intake port when the first member is in the closed position, and a second member configured to cover the exhaust port when the second member is in the closed position.

In addition to one or more of the features described herein, the actuator is a mechanical actuator or an electromechanical actuator.

In another exemplary embodiment, a two-stroke engine includes a cylinder having a cylinder axis, the cylinder including a combustion chamber and a fluid port formed in a sidewall of the cylinder, the fluid port including at least one of an intake port and an exhaust port, and a piston configured to move within the cylinder along the cylinder axis during a power cycle between a first position in which a volume of the combustion chamber is at a maximum, and a second position in which the volume of the combustion chamber is at a minimum. The engine includes a valve member moveable along the cylinder axis and disposed in the cylinder between the piston and the sidewall, the valve member configured to be moved between an open position and a closed position, where the valve member covers the fluid port in the closed position, and an actuator configured to move the valve member in coordination with movement of the piston during a power cycle, so that the valve member is in the closed position as the piston traverses the fluid port.

In addition to one or more of the features described herein, the piston includes a sealing ring configured to provide a fluid seal between the piston and the sidewall, and the actuator is configured to move the valve member relative to the piston so that the sealing ring is prevented from engaging a boundary of the fluid port during the power cycle.

In addition to one or more of the features described herein, the valve member is in the open position when the piston is in the first position, and the actuator is configured to move the valve member with the piston as the sealing ring traverses the fluid port, and maintain the valve member in the closed position as the sealing ring moves beyond the fluid port and the piston moves to the second position.

In addition to one or more of the features described herein, the valve member is in the closed position when the piston is in the second position, and the actuator is configured to maintain the valve member in the closed position when the piston commences moving toward the first position, and move the valve member from the closed position toward the open position as the piston approaches the first position and as the sealing ring traverses the fluid port.

In addition to one or more of the features described herein, the valve member is configured as a sleeve extending along a circumference of the cylinder, and the sleeve is configured to cover both the intake port and the exhaust port when the sleeve is in the closed position.

In addition to one or more of the features described herein, the valve member includes a first member configured to cover the intake port when the first member is in the closed position, and a second member configured to cover the exhaust port when the second member is in the closed position.

In yet another exemplary embodiment, a method of operating a two-stroke engine includes providing a fuel mixture to a cylinder of the two-stroke engine, the cylinder having a cylinder axis, the cylinder including a combustion chamber and a fluid port formed in a sidewall of the cylinder, the fluid port including at least one of an intake port and an exhaust port, the cylinder enclosing a piston configured to move within the cylinder between a first position in which a volume of the combustion chamber is at a maximum, and a second position in which the volume of the combustion chamber is at a minimum. The method also includes moving the piston along the cylinder axis between the first position and the second position during a power cycle, and moving a valve member along the cylinder axis in coordination with the piston, the valve member disposed in the cylinder between the piston and the sidewall and moveable between an open position and a closed position. The valve member covers the fluid port in the closed position, and the valve member is controlled so that the valve member is in the closed position as the piston traverses the fluid port.

In addition to one or more of the features described herein, the piston includes a sealing ring configured to provide a fluid seal between the piston and the sidewall.

In addition to one or more of the features described herein, the valve member is moved relative to the piston so that the sealing ring is prevented from engaging a boundary of the fluid port during the power cycle.

In addition to one or more of the features described herein, the valve member is in the open position when the piston is in the first position, and the valve member is moved with the piston as the sealing ring traverses the fluid port, and the valve member is maintained in the closed position as the sealing ring moves beyond the fluid port and the piston moves to the second position.

In addition to one or more of the features described herein, the valve member is in the closed position when the piston is in the second position, the valve member is maintained in the closed position when the piston commences moving toward the first position, and the valve member is moved from the closed position toward the open position as the piston approaches the first position and as the sealing ring traverses the fluid port.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
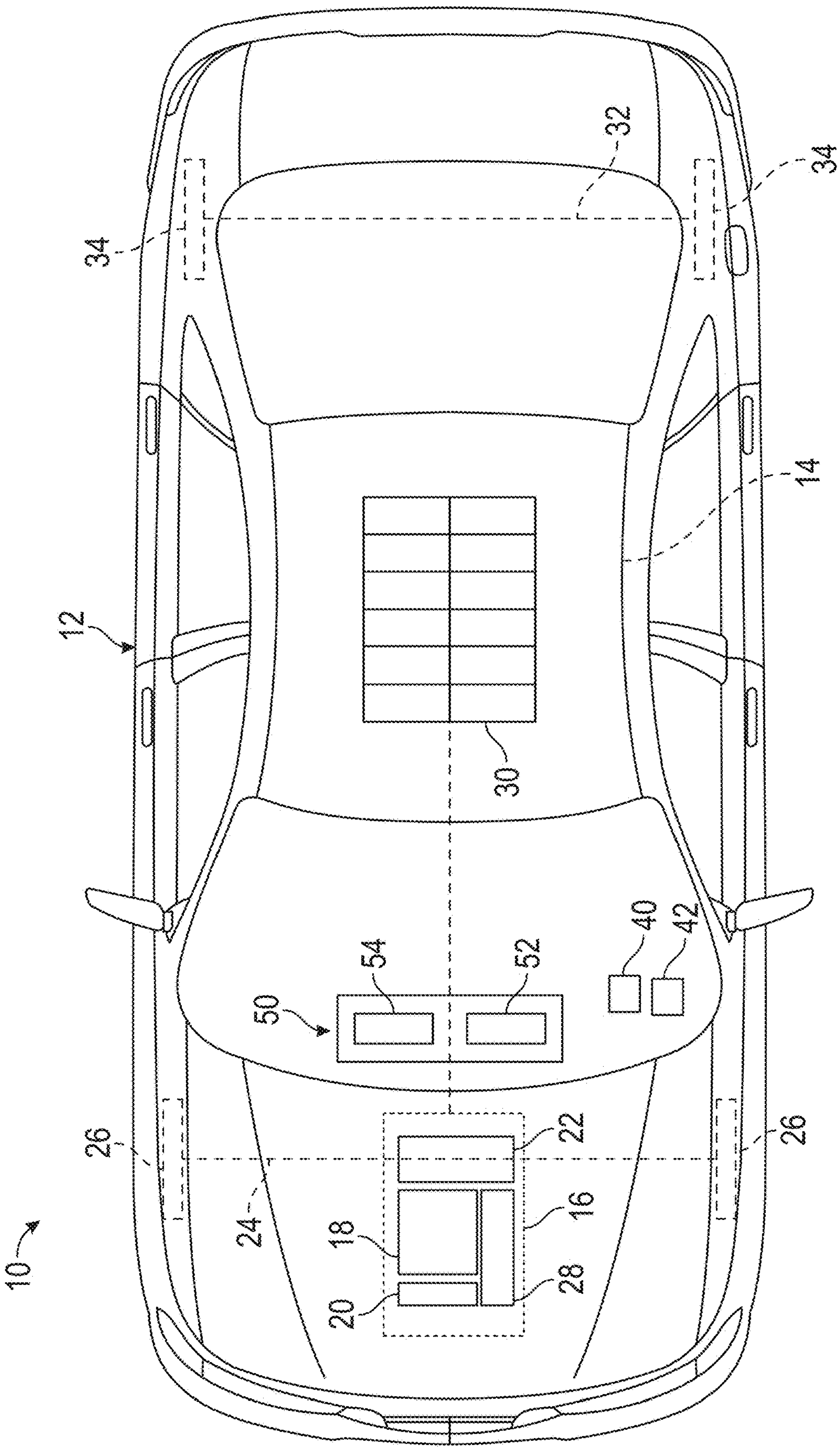
FIG. 1 is a top schematic view of a vehicle, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, a two-stroke combustion engine and associated methods are provided, which feature a valve system having a moveable valve member. The valve member is disposed internal to a cylinder and between a sidewall of the cylinder and a piston, and is moveable along a cylinder axis in coordination with movement of the piston during power cycles as the engine operates. The valve member is moved as described herein, to support the piston as the piston traverses an inlet port and/or an outlet port formed in the sidewall.

Embodiments described herein present numerous advantages and technical effects. The embodiments provide for improvements in efficiency and performance of two-stroke engines, which provides a reduction in complexity and size.

For example, engine pistons typically include sealing rings, and during a power cycle of a conventional two-stroke engine, the sealing rings pass over irregular surfaces defined by an intake port and an exhaust port. Mechanical impact forces may develop when the sealing rings pass over irregular surfaces at the port boundaries, which may impact ring integrity resulting in a shortened operational life. Embodiments described herein provide mechanisms for transporting or “ferrying” the rings across the ports so that the rings do not interact with the boundaries or edges of the ports. In this way, the mechanical impact forces are greatly reduced, leading to an increased operational life, improved sealing, and enhanced operational efficiency. In addition, the need for port bridges and other components is eliminated.

In automotive applications, embodiments provide for increased fuel economy and efficiency due to reduced engine friction, a greater ability to optimize the shape of the combustion chamber, and lower combustion heat loss. Furthermore, the embodiments result in a significant reduction in the mass of engine systems, providing increased opportunities for use of two-stroke engines in hybrid and other vehicles.

The embodiments are not limited to use with any specific vehicle and may be applicable to various contexts. For example, embodiments may be used with automobiles, trucks, construction equipment, power tools, motorcycles, boats, aircraft, and/or any other device or system that includes a two-stroke engine or engines.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion systems 16 and other vehicle components, such as a braking subsystem, a suspension system, a steering subsystem, and if the vehicle is a hybrid electric vehicle, a fuel injection subsystem, an exhaust subsystem and others.

For example, the vehicle 10 is a hybrid vehicle, in which the propulsion system 16 includes a combustion engine 18 for applying torque, and other components for supporting engine operation, such as a cooling system 20. The engine 18 is connected to a transmission system 22 for controlling the transfer of torque from the engine 18 to a front drive shaft 24 connected to front wheels 26. The propulsion system 16 also includes an electric drive system including at least one electric motor 28 connected to a high voltage (HV) battery pack 30.

The engine 18 includes one or more cylinders and respective piston(s), and is configured as a two-stroke engine. A two-stroke engine has a compression stroke and a power/expansion stroke in each cycle, and features cross-flow scavenging or another form of scavenging. The engine 18 may utilize an Atkinson cycle, which has four phases in its idealized thermodynamic cycle: isentropic compression, isochoric heat addition, isentropic expansion, and isobaric heat rejection. In a two-stroke Atkinson engine, the intake and exhaust take place mostly during the compression stroke so that the distance traveled by the piston during compression is shorter than the distance traveled during the power/expansion stroke.

The propulsion system 16 is not limited to the configuration shown in FIG. 1, as there may be any number of propulsion devices. For example, the vehicle 10 can include a motor and/or combustion engine connected to a rear drive shaft 32 and rear wheels 34 (in addition to or in place of the engine 18 and the motor 28).

One or more processing devices are included to control operation of the propulsion system 16. In an embodiment, an engine control unit (ECU) 40 is configured to receive torque requests and control the engine 18, and a motor control unit (MCU) 42 is configured to control application of torque by the motor 28.

The vehicle 10 also includes a computer system 50 that includes one or more processing devices 52 and a user interface 54. The computer system 50 may communicate with the ECU 40, the MCU 42 and/or other processor(s), for example, to provide commands thereto in response to a user input (e.g., torque commands). The various processing devices, modules and units may communicate with one another via a communication device or system, such as a controller area network (CAN) or transmission control protocol (TCP) bus.

FIGS. 2-9 depict embodiments of a two-stroke engine 60, which includes components for supporting a piston or pistons during power cycles. The engine 60 may be part of a vehicle (e.g., as the engine 18) but is not so limited. The engine 60 may be equipped either for spark ignition or compression ignition by including any of a variety of suitable fuel injectors and igniters.

The engine 60 includes one or more cylinders and associated pistons, and includes a moveable support device disposed with each cylinder. Each cylinder includes a sealing feature, such as a sealing ring. The support device functions to provide support to a piston in a cylinder as the piston sealing ring moves across one or more fluid ports (e.g., an intake port and/or exhaust port). The support device, which may include one or more valve members disposed within each cylinder, allows for elimination of components such as exhaust port bridges (which are typically hot spots causing oil consumption) by "ferrying" the piston sealing rings across the ports on the support device in place of bridges. In addition, the support device reduces ring wear and cylinder thermal fatigue.

Although embodiments are discussed in conjunction with a sealing ring, the embodiments are not so limited. Accordingly, it is understood that the description herein may apply to cylinders having other sealing structures (e.g., multi-part seals). For example, a cylinder may have a flattened oval cross section and a seal structure may include two half-circular end pieces and two straight pieces.

Figure 2:
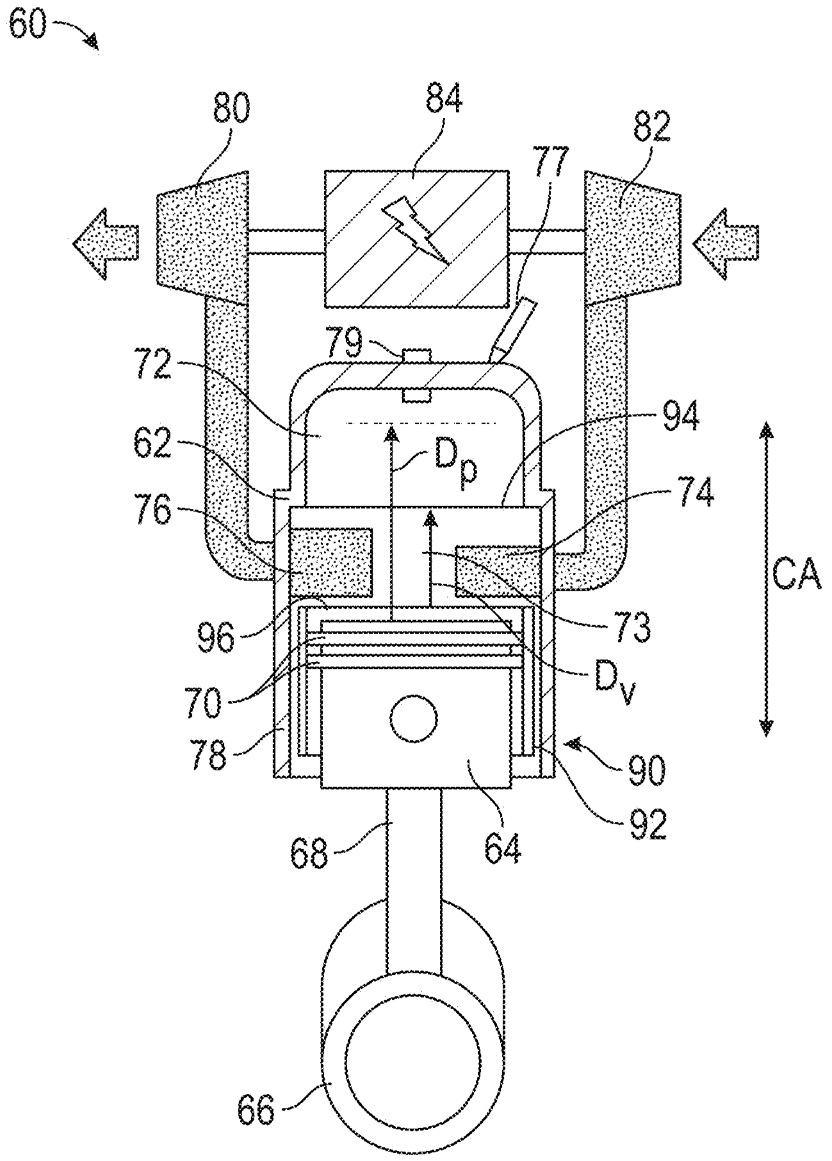
FIG. 2 is a cross-sectional view of an engine including a valve system, in accordance with an exemplary embodiment.

FIG. 2 is a cross-sectional view of an embodiment of the engine 60, which includes an engine block (not shown) that houses one or more cylinders 62. Although one cylinder 62 is shown, it is understood that the engine 60 may have any number of cylinders 62 and associated components. The embodiment of the engine 60 is shown in an orientation with a piston 64 moving vertically in the cylinder 62, in an upward direction for the compression stroke and in a downward direction for the power/expansion stroke, but it is understood that the engine 60 may be constructed to be operated with cylinders 62 in any orientation or in multiple orientations (e.g., as a V-engine).

The cylinder 62 houses a piston 64 connected to a crankshaft 66 via a connecting rod 68. The piston 64 is moveable by a distance $D_p$ in the direction of a cylinder axis CA between a bottom dead (BD) position (shown in FIG. 2) and a top dead (TD) position (not shown). The crankshaft 66 is shown to be approximately aligned with the center of the cylinder 62, but it is understood that the crankshaft 66 may be offset from the center of the cylinder 62 to reduce engine friction. The piston 64 also includes a fluid seal, such as a set (i.e., one or more) of piston sealing rings 70. The piston sealing ring(s) 70 provide a seal between the piston and an interior surface of the cylinder 62.

The cylinder 62 defines an upper chamber 72, which functions as a combustion chamber, and a lower chamber 73. The lower chamber 73 includes an intake port 74 and an exhaust port 76 formed in a sidewall 78 of the cylinder 62. The intake port 74 receives an air-fuel mixture or air that is mixed with injected fuel and combusted in the upper chamber 72. It is noted that the engine 60 is not limited to the cross-flow configuration shown in FIG. 2, as the intake port 74 and the exhaust port 76 may be located at any of various positions on the cylinder 62. For example, the intake and exhaust ports may be located on the same side of the cylinder 62 with the exhaust port 76 above the intake port 74 in a loop-flow configuration (not shown).

Fuel may be received from a fuel source (e.g., fuel tank or gas cylinder, not shown) and mixed with air via a fuel injector 77, and the resulting fuel-air mixture is ignited by an ignitor 79 (e.g., a spark plug or glow plug). It is noted that embodiments of FIGS. 3-9 may have similar injection and ignition components. It is further noted that embodiments described herein are not limited to any particular fuel injection or ignition system and are not limited to the Atkinson cycle as described herein.

In an embodiment, the engine 60 includes an electric turbocharger, which includes a turbine 80 operatively coupled to a compressor 82, and a motor-generator 84. During a power cycle, the cylinder 62 receives compressed air from the compressor 82 and delivers hot exhaust gases through the turbine 80. In an embodiment, the engine 60 takes the form of an Atkinson-cycle engine resulting from the relative motion of the piston 64 and one or more members of a valve system 90. The compressor 82 affects part of the overall compression of the Atkinson cycle, and the turbine 80 affects part of the overall expansion of the Atkinson cycle.

The engine 60 includes the valve system 90, and the valve system 90 includes one or more moveable components (also referred to as "valve members") disposed within the cylinder 62 and proximate to the sidewall 78. The valve system 90 is operable to support the piston 64 including the piston sealing rings 70 as the piston 64 moves across the intake port 74 and/or the exhaust port 76. It is noted that the valve system 90 may include a single moveable component or multiple moveable components.

In an embodiment, as shown in FIG. 2, the valve system 90 includes a single moveable valve member in the form of a sleeve valve 92. The sleeve valve 92 may have a cylindrical structure that extends around the entire circumference of the cylinder 62, or otherwise be configured so that the sleeve valve 92 can cover both the intake and exhaust simultaneously. The sleeve valve 92 is moveable in the direction of the axis CA, and can move a distance Dy until the sleeve valve 92 abuts a top edge 94.

The sleeve valve 92 (or other valve member) is controlled using an actuator (not shown) that is operated mechanically (e.g., via a cam surface) or by a suitable controller or processing device, such as the MCU 42 (FIG. 1). The actuator is operated to move the sleeve valve 92 in coordination with movement of the piston 64, so that the sealing rings 70 ride along a surface of the sleeve valve 92 (or move with the sleeve valve 92) as the sealing rings 70 and the piston 64 traverse the portion(s) of the cylinder 62 that define the intake port 74 and/or the exhaust port 76.

In the embodiment of FIG. 2, the intake port 74 and the exhaust port 76 are both located at the lower chamber 73, and the lower chamber 73 has a linear top edge 94. The top edge 94 may be flat as shown (i.e., the top edge 94 defines a plane that is orthogonal to the axis CA). The sleeve valve 92 has a flat top edge 96 that conforms to the path of the top edge 94 of the lower chamber 73.

Intake port timing and exhaust port timing are controlled by intake port location, exhaust port location, and timing of the movement of the sleeve valve 92. The timing and movement of the sleeve valve 92 is restricted by the piston motion, so that the sleeve valve 92 is in a closed position and covers the ports before the piston sealing rings 70 reach the top edge 94 of the lower chamber 73.

Figure 3:
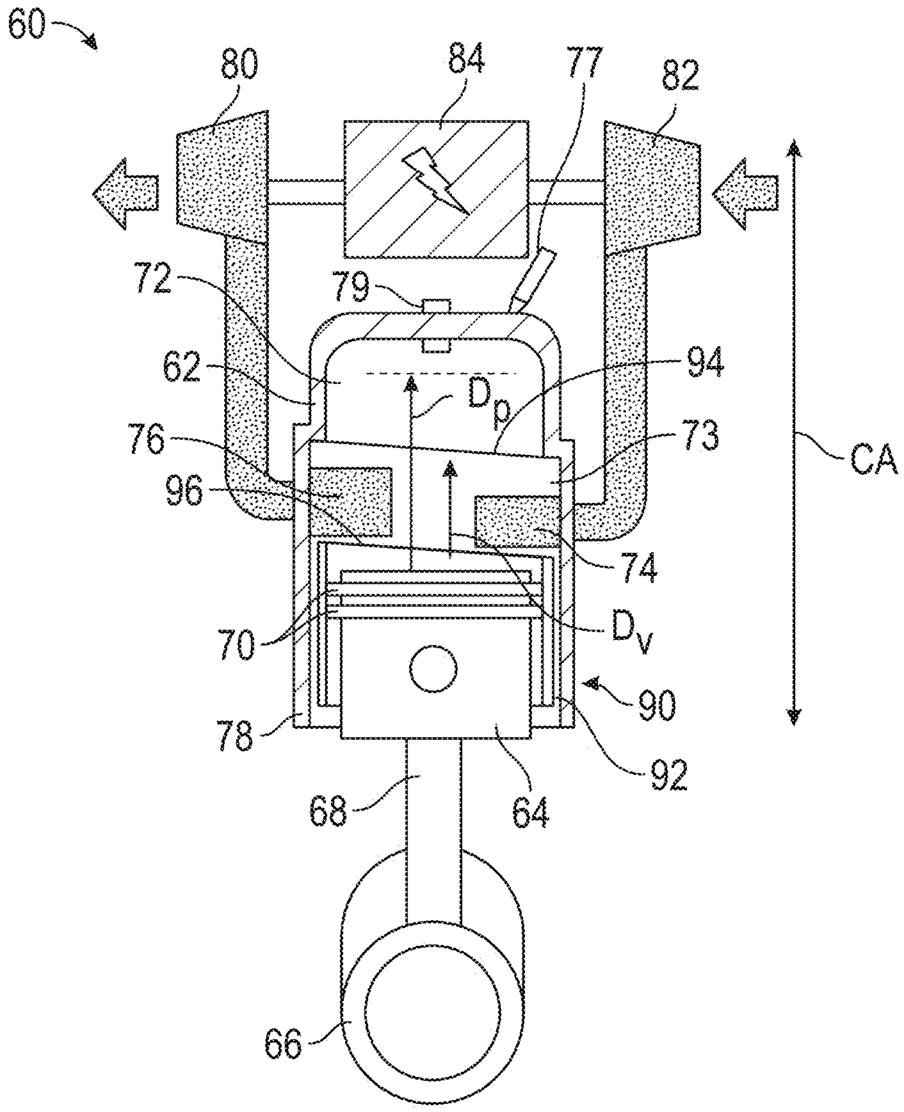
FIG. 3 is a cross-sectional view of an engine including a valve system, the valve system having a sleeve valve disposed in a cylinder, in accordance with an exemplary embodiment.

Referring to FIG. 3, in an embodiment, the top edge 96 of the sleeve valve 92 is angled to conform to a top edge 94 of the lower chamber 73 that is likewise angled relative to the piston sealing rings 70. This angle extends the distance that is traversed by the piston 64 during a stroke when the piston 64 and each of the sealing rings 70 is supported by both the sleeve valve 92 and the cylinder 62. This configuration, in some instances, may result in a smoother and more gradual transition between being supported by the sleeve valve 92 to being supported by the cylinder 62, as compared to the embodiment of FIG. 2 where the top edges 96 and 94 are parallel with the sealing rings 70. This angling of the top edges 96 and 94 also allows an additional degree of freedom in optimizing the configuration and timing of the covering and uncovering of the ports 76 and 74 relative to one another (i.e., one port 76 is higher than another port 74 in the direction of the axis CA and the angle of the top edges 96 and 94 causes them to be covered and uncovered more nearly at the same time).

The valve system 90 may include a single valve member, such as the sleeve valve 92 of FIGS. 2 and 3. Alternatively, the valve system 90 may include multiple individual valve members. The valve members may be controlled together via a single actuator, or may be independently controllable.

Figure 4:
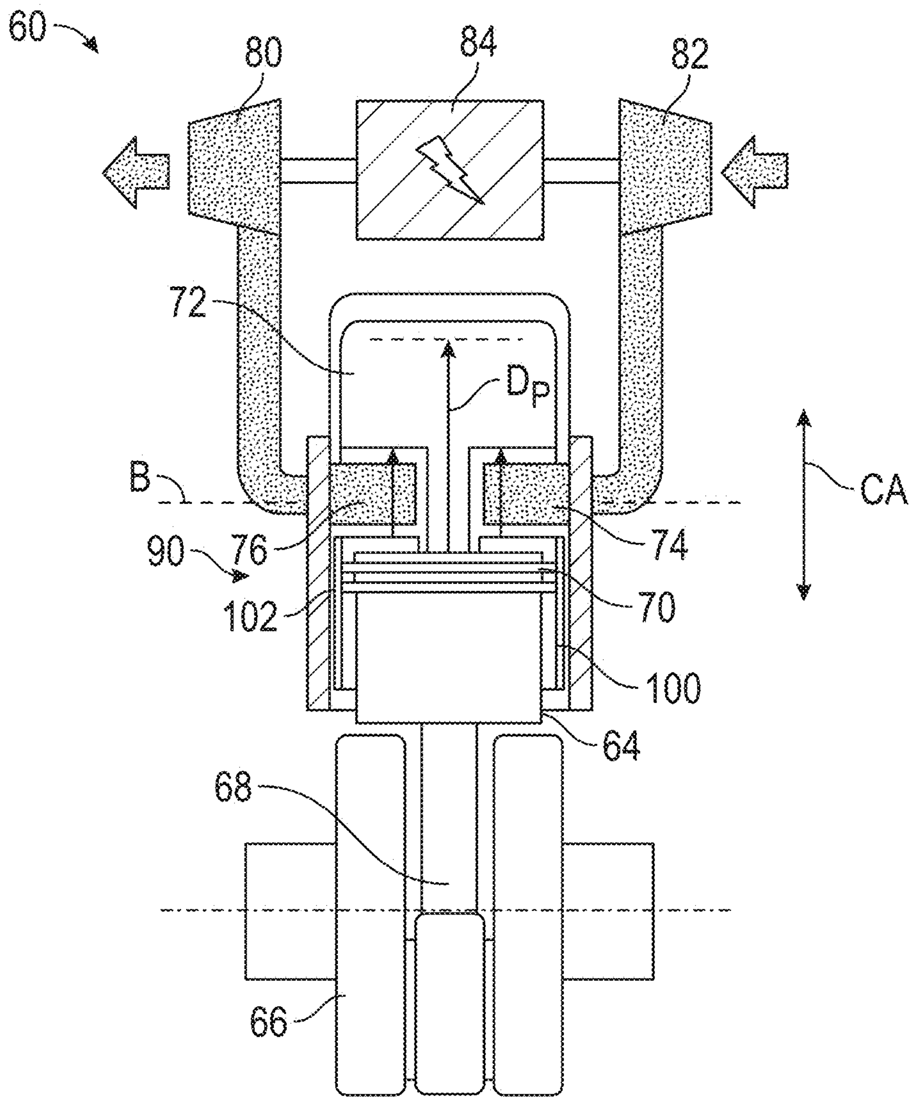
FIG. 4 is a cross-sectional side view of an engine including a valve system, the valve system having a set of independently controllable valve members, in accordance with an exemplary embodiment.

FIG. 4 depicts an embodiment of the engine 60, in which the valve system 90 includes a split valve member formed by two separate valve members. The separate valve members are shown as gate valves 100 and 102. An intake gate valve 100 is moveable in coordination with the piston 64 to cover the intake port 74 as the piston sealing rings 70 traverse the intake port 74, and an exhaust gate valve 102 is moveable in coordination with the piston 64 to cover the exhaust port 76 as the sealing rings 70 traverse the exhaust port 76.

Figure 5A:
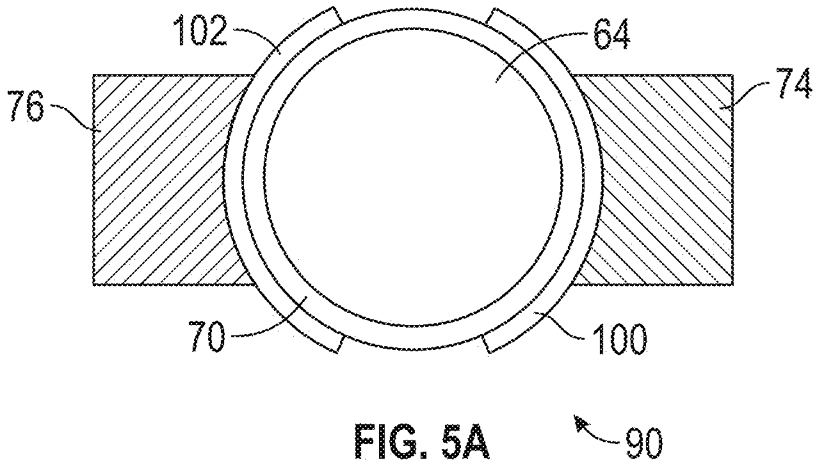
FIGS. 5A-B are cross-sectional top views of the valve members of FIG. 5, in accordance with an exemplary embodiment.

FIG. 5A is a top cross-sectional view (i.e., in a plane orthogonal to the axis CA and represented by line B of FIG. 4) of the embodiment of FIG. 4. As shown, the intake gate valve 100 forms a first sector of the lower chamber 73, and the exhaust gate valve 102 forms a second sector of the lower part of the cylinder. Intake port 74 timing is controlled by the intake port location and intake gate valve timing, and exhaust port 76 timing is controlled by the exhaust port location and exhaust gate valve timing. Valve timing is restricted by the piston 64 motion, so that both gate valves 100 and 102 are closed before the piston sealing rings 70 reach the open portions of the ports.

Figure 5B:
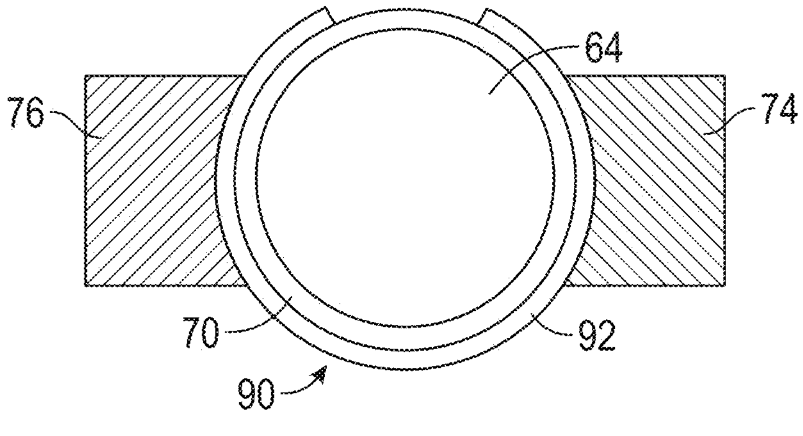

FIG. 5B is a top-cross-sectional view (i.e., in a plane orthogonal to the axis CA and represented by line B of FIG. 4) of an alternative configuration of a split valve member. In this example, the valve system 90 includes the sleeve valve 92 as a single component. The sleeve valve 92 in this embodiment does not form a full circumference, but is still configured to cover both ports 74 and 76 as the piston sealing rings 70 traverse the ports.

A split valve member (e.g., a sleeve with a split section as shown in FIG. 5B, or separate sections as shown in FIG. 5A) allows an exposed portion of the lower chamber 73 to extend below the uppermost position of the top of the sleeve valve 92 (or the gate valves 100 and 102), so that the side force on the piston 64 during the entire downward (power) stroke may be transmitted to the cylinder 62, thereby relieving the valve member from this force. When the valve member is split into separate sections (e.g., as separate gate valves 100 and 102), the sections are relieved from the side force on the piston 64 during both the downward stroke (greater side force) and the compression stroke (lesser side force). It may be advantageous to split the valve member on one side (e.g., as shown in FIG. 5B) because the friction from the side force during the compression stroke helps to close the valve member with the correct timing, but the side force on the piston 64 during the power stroke tries to open the valve member prematurely.

Figure 6:
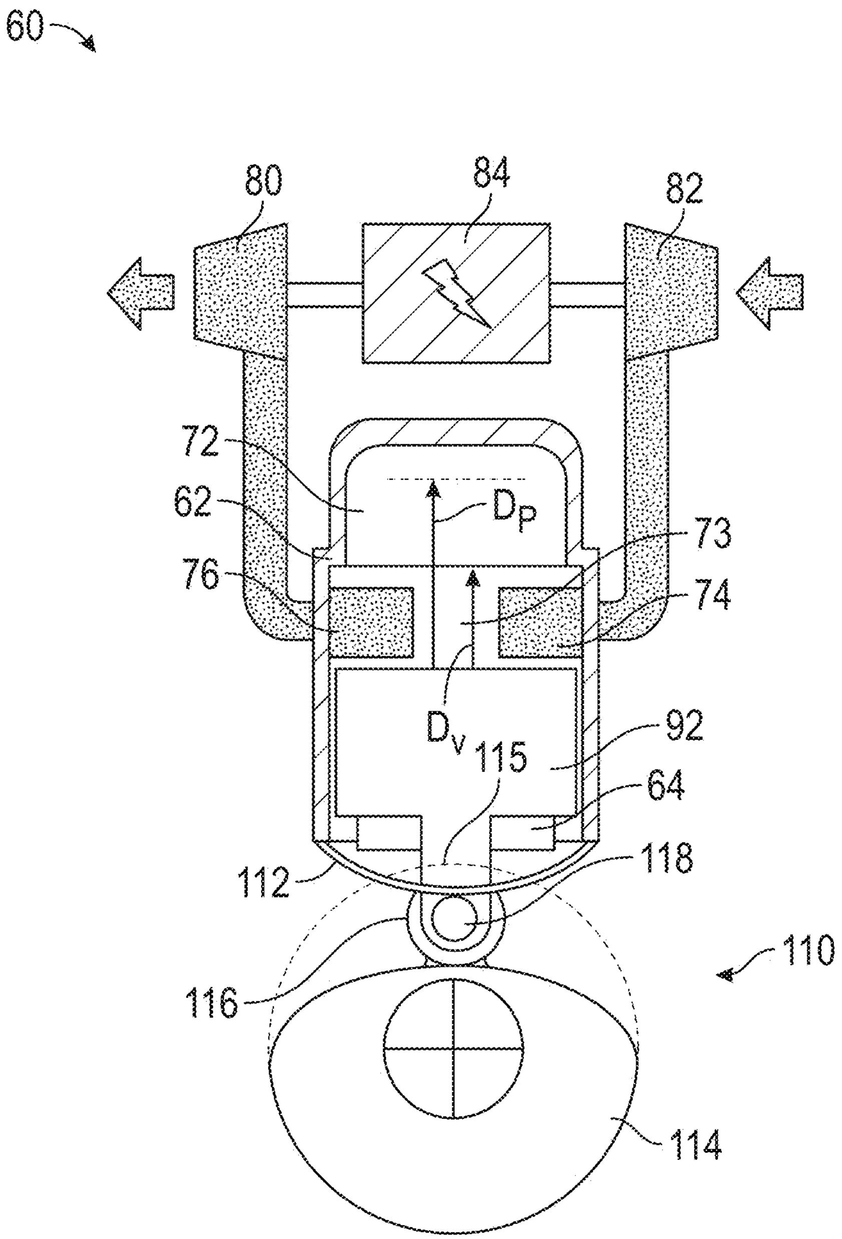
FIG. 6 is a cross-sectional view of an engine including a valve system and a mechanical actuator, in accordance with an exemplary embodiment.
Figure 7:
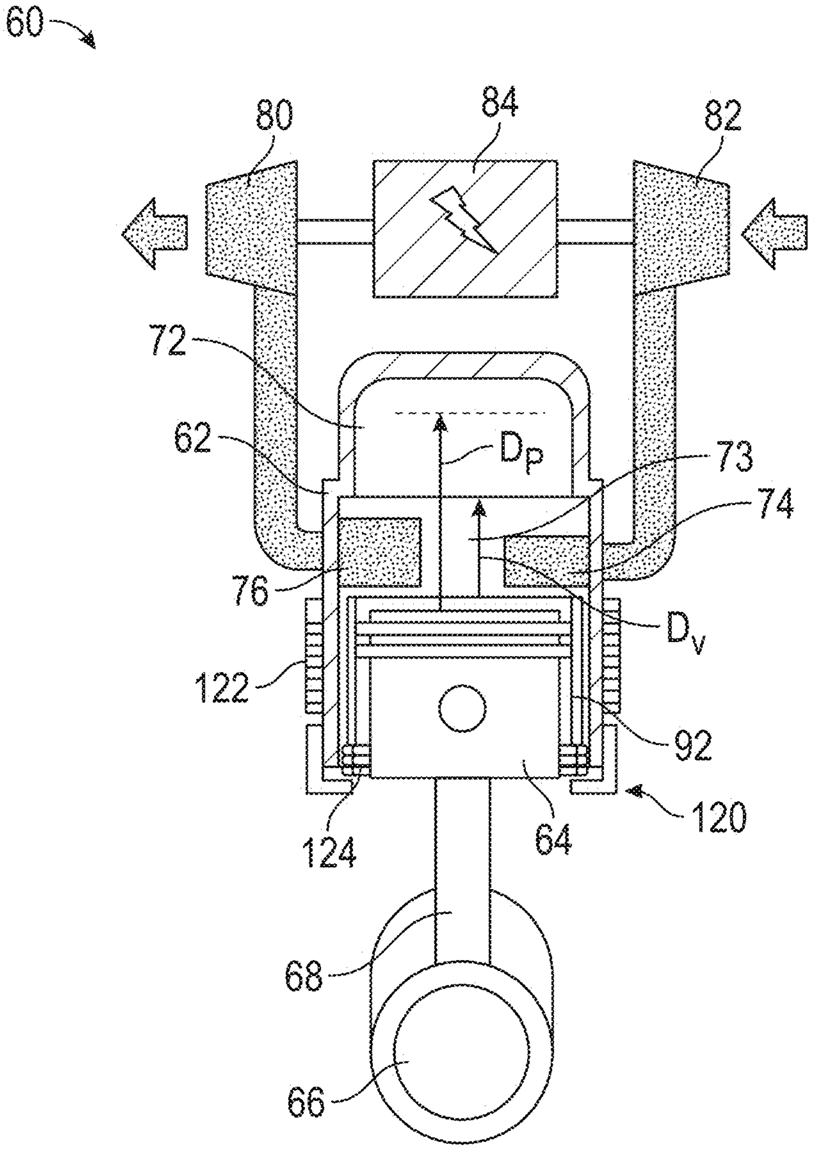
FIG. 7 is a cross-sectional view of an engine including a valve system and an electrical actuator, in accordance with an exemplary embodiment.

The valve member(s) (e.g., the sleeve valve 92, or the gate valve 100 and 102), are controllable by operating an actuator coupled to each valve member. The actuator may operate mechanically, or may be controlled by a suitable controller or processing device. FIGS. 6 and 7 show examples, including a mechanical actuator and an electrical or electromechanical actuator.

In the example of FIG. 6, the sleeve valve 92 is mechanically connected to an actuator 110, which includes a leaf spring 112 and a cam 114. The cam 114 may be a surface of the crankshaft 66 or a separate cam. In this example, the sleeve valve 92 is connected via a downward extension 115 of a part of the circumference of the sleeve valve 92 to a roller follower 116. A pin 118 connects the sleeve valve 92 to the follower 116 and connects the sleeve valve 92 to the spring 112. In FIG. 6, the sleeve valve 92 (or other valve member) is moved in one direction by the cam 114 and moved in the opposite direction by the spring 112 to cover and uncover a port or ports.

If multiple valve members are present, each valve member may be connected to a respective cam. For example, an intake gate valve (e.g., the gate valve 100 of FIG. 4) may be operated by a cam and a spring on one side of the cylinder 62 along a crankshaft axis, and an exhaust gate valve (e.g., the gate valve 102 of FIG. 4) may be operated by another cam and another spring on another side of the cylinder 62 along the crankshaft axis, with the ports located appropriately (not shown).

In the example of FIG. 6, since the sleeve valve 92 covers the ports by sliding and the sleeve valve 92 seals against a pressure that is greatly reduced from that of combustion, the top surface of the sleeve valve 92 can define a small axial gap with the upper chamber 72 of the cylinder 62 (i.e., a gap between the top edge 94 and the upper chamber 72) when the sleeve valve is at an uppermost position. However, this gap should not be large enough for a piston sealing ring 70 to fall into the gap while the piston sealing ring 70 is crossing the gap. Therefore, in the example of FIG. 6, the sleeve valve 92 is closed by a predetermined action of the cam 106 and opened by the force from the spring 104, which is the inverse of the actuation typical for poppet valves known in the art. However, it is understood that an actuation mechanism alternately may be configured (not shown) either to open a valve (i.e. to uncover a port) by action of a cam and to close the valve (i.e. to cover a port) by force from a spring, or to both open and close the valve by action of a cam.

In the example of FIG. 7, an electro-mechanical actuator 120 is provided for controlling movement of the valve member. An electrical winding 122 encloses the lowermost position of the sleeve valve 92. The sleeve valve 92 includes a magnetic material that may either be the sleeve itself or another part such as a magnet (not shown), so that the magnetic flux from an electric current through the winding 112 draws the sleeve valve 92 downward to its lowermost position. A coil spring 124 beneath the sleeve valve 92 is compressed when the sleeve valve 92 is moved by the electric current, and the coil spring 114 returns the sleeve valve 92 when the electric current is removed or reversed. In this example, the electro-mechanical actuator 120 is configured to uncover the ports 74 and 76 with force from the electrical winding 112 and sleeve valve 92, and to cover the ports 74 and 76 with force from the coil spring 114, because the coil spring 114 may be considered to be more reliable. However, it is understood that the electro-mechanical actuator 120 alternately could be configured to cover ports with force from an electric winding.

FIGS. 8A-F depict various positions of the cylinder 62 and a valve member, and represents aspects of a method of operating a two-stroke engine over a power cycle. The power cycle includes a power/expansion stroke and a compression stroke. The relative motions of the piston 64 and the sleeve valve 92 allow the power cycle to resemble the idealized Atkinson cycle. Operation of the engine 60 is discussed with reference to the embodiment of FIG. 2, but is not so limited.

Figure 8A:
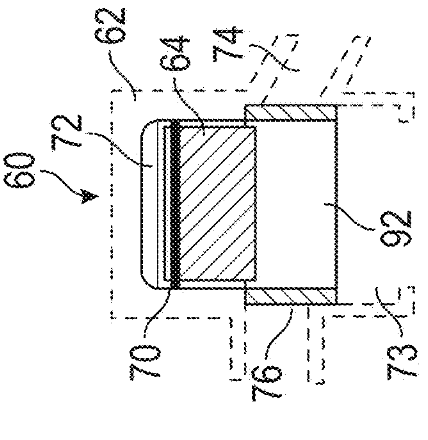
FIGS. 8A-F depict a cylinder of the engine of FIG. 2, and illustrate positions of the piston and a valve member in the cylinder during a power cycle.

As shown in FIG. 8A, at the start of the power stroke, the piston 64 is in the TD position and an air-fuel mixture is compressed (the volume of the upper chamber 72 above the piston is at a minimum). The sleeve valve 92 is at the closed position and obstructs or covers the intake port 74 and the exhaust port 76.

Figure 8B:
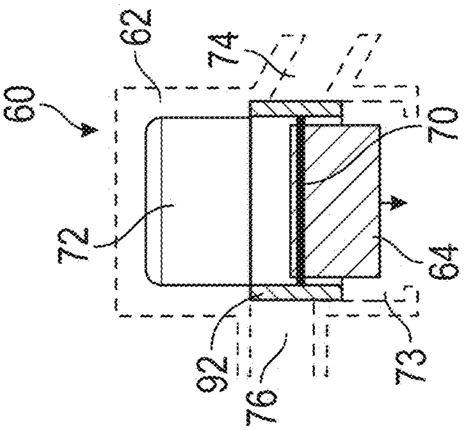
Figure 8C:
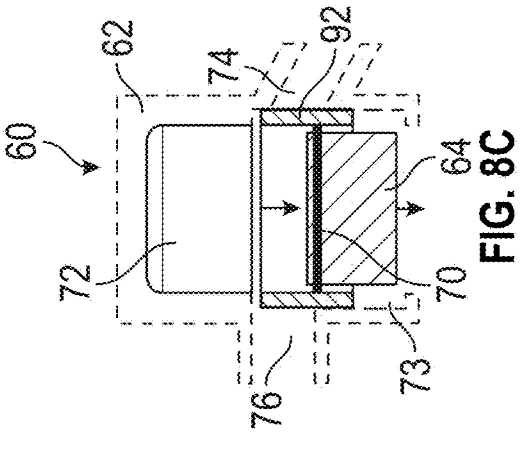

Upon combustion, expansion forces the piston 64 downward as shown in FIG. 8B. The piston 64 traverses the ports 74 and 76, and the piston sealing rings 70 ride along the sleeve valve 92. As a result, the piston sealing rings 70 need only traverse a very small gap or discontinuity (between the side of the upper chamber 72 and the top of the sleeve valve 92). In addition, the sleeve valve 92 provides a linear vertical path for the piston sealing rings 70 to follow, thereby avoiding any discontinuities due to a difference in diameter between the upper chamber 72 and the lower chamber 73. In this way, components such as port bridges and poppet exhaust valves are not needed.

Figure 8D:
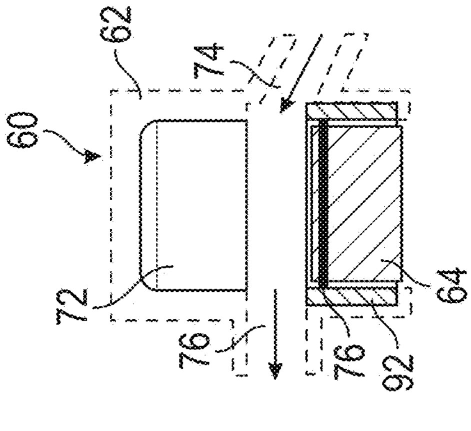

Once the piston 64 has completed most of the power/expansion stroke (FIG. 8C), the sleeve valve 92 is actuated and begins to move downward and open the ports 74 and 76. Scavenging begins where fresh air or fuel-air mixture is admitted from, for example, an external scavenging device (not shown) or a chamber below the piston 64 (not shown). The power stroke ends when the piston 64 is at the BD position and the ports 74 and 76 are opened, as shown in FIG. 8D.

Figure 8E:
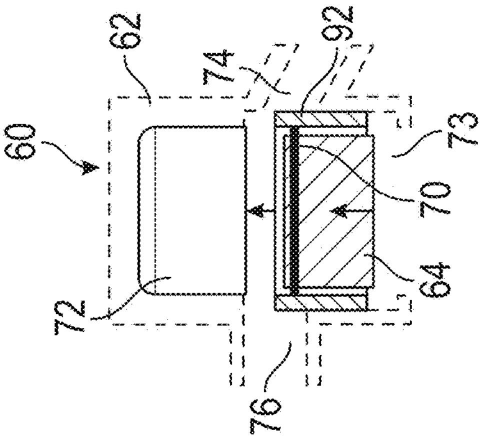
Figure 8F:
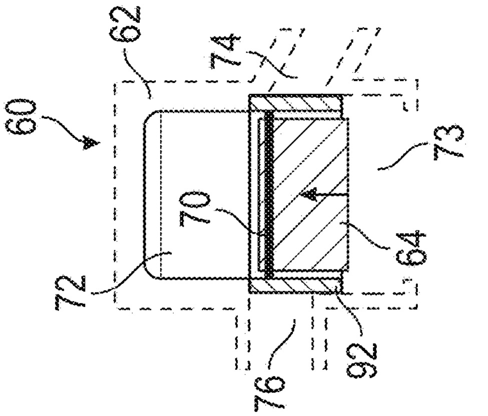

At the beginning of the compression stroke, shown in FIG. 8E, the piston 64 moves upward toward the upper chamber 72. The sleeve valve 92 is actuated to move upward with the piston 64, so that the piston sealing rings 70 stay within the sleeve valve 92 as they move across the ports 74 and 76. Once the piston sealing rings 70 reach the top edge of the ports 74 and 76 (FIG. 8F), the sleeve valve 92 is at the closed position and the ports 74 and 76 are covered. The piston continues to move upward and compresses the air or fuel-air mixture, and completes the power cycle.

As noted above, the valve member may be configured to cover both the intake and exhaust ports, or configured to cover a single port (e.g., either an exhaust port or an intake port but not both). For example, a sleeve valve for an intake port could be combined with a poppet exhaust valve in the head, or a sleeve valve for an exhaust port could be combined with a poppet intake valve in the head.

Figure 9:
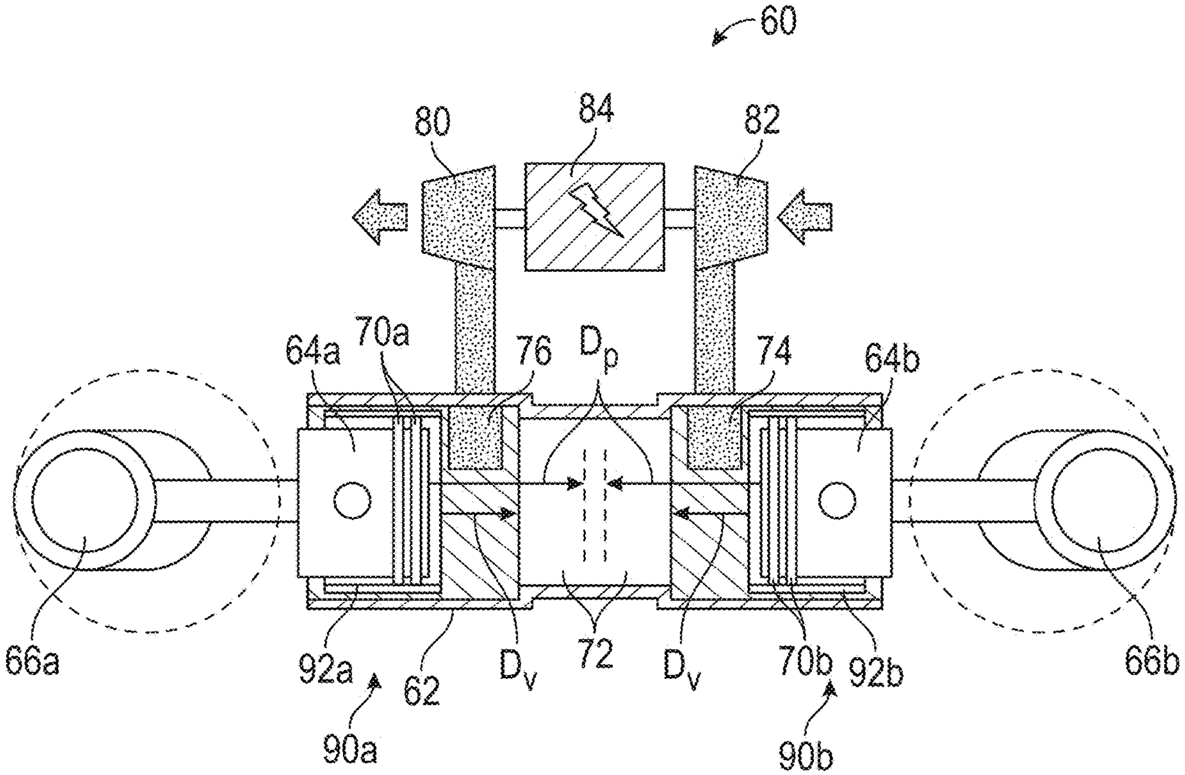
FIG. 9 is a cross-sectional view of an engine including a cylinder and opposing pistons, and a valve system, in accordance with an exemplary embodiment.

FIG. 9 depicts an embodiment of the engine 60, in which a valve member is configured to move with a piston relative to a single port. In this example, the engine 60 is an opposed piston engine, in which the cylinder 62 houses opposing pistons 64*a* and 64*b*. A first valve system 90*a* includes a valve member such as a sleeve valve 92*a*, which is configured to be moved in coordination with the piston 64*a* to cover the exhaust port 76 when the piston sealing rings 70*a* traverse the exhaust port. For example, the piston 64*a* is connected to a crankshaft 66*a*, and an actuator (e.g., a cam system or electro-mechanical system, not shown) moves the sleeve 92*a*.

A second valve system 90*b* includes a valve member such as a sleeve 92*b*, which is similarly configured to be moved via a suitable actuator in coordination with the piston 64*b*. The piston 64*b* is connected to a crankshaft 66*b*. The crankshaft 66*b* may be used as part of an actuator to control the sleeve 92*b*, or other suitable actuation may be used (not shown).

Figure 10:
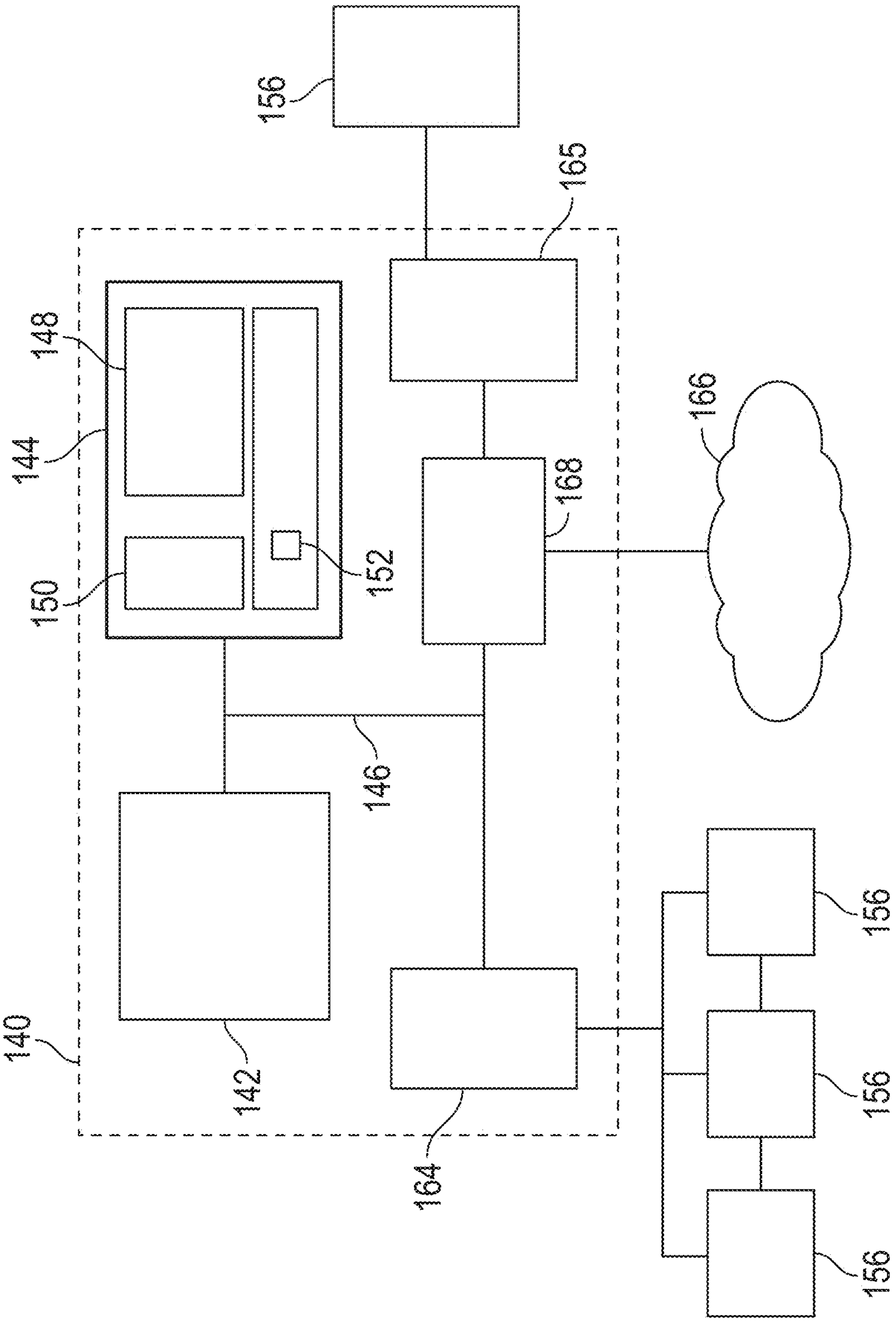
FIG. 10 depicts a computer system, in accordance with an exemplary embodiment.

FIG. 10 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as read-only memory (ROM), and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module or modules 152 may be included to perform functions discussed herein. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 140. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A valve system for a two-stroke engine, comprising:

a valve member disposed in a cylinder of the two-stroke engine, the cylinder having a cylinder axis, the valve member disposed between a piston and a sidewall of the cylinder, the piston including a sealing ring configured to provide a fluid seal between the piston and the sidewall, the sealing ring configured to move along the cylinder axis with the piston and traverse the fluid port, the cylinder including a combustion chamber and a fluid port formed in the sidewall, the fluid port including at least one of an intake port and an exhaust port, the piston configured to move within the cylinder along the cylinder axis during a power cycle between a first position in which a volume of the combustion chamber is at a maximum, and a second position in which the volume of the combustion chamber is at a minimum; wherein:

the valve member is moveable along the cylinder axis, and the valve member is configured to be moved between an open position and a closed position, wherein the valve member covers the fluid port in the closed position; and an actuator configured to move the valve member in coordination with movement of the piston during a power cycle, so that the valve member is in the closed position as the piston traverses the fluid port, wherein the actuator is configured to move the valve member relative to the piston so that the sealing ring is prevented from engaging a boundary of the fluid port during the power cycle.

2. The valve system of claim 1, wherein the valve member is formed from a single body.

3. The valve system of claim 1, wherein the actuator is configured to move the valve member relative to the piston so that the sealing ring remains within the valve member as the sealing ring traverses the fluid port.

4. The valve system of claim 1, wherein the valve member is in the open position when the piston is in the first position, and the actuator is configured to move the valve member with the piston as the sealing ring traverses the fluid port, and maintain the valve member in the closed position as the sealing ring moves beyond the fluid port and the piston moves to the second position.

5. The valve system of claim 4, wherein the valve member is in the closed position when the piston is in the second position, and the actuator is configured to maintain the valve member in the closed position when the piston commences moving toward the first position, and move the valve member from the closed position toward the open position as the piston approaches the first position and as the sealing ring traverses the fluid port.

6. The valve system of claim 1, wherein the valve member is configured as a sleeve extending along a circumference of the cylinder, and the sleeve is configured to cover both the intake port and the exhaust port when the sleeve is in the closed position.

7. The valve system of claim 6, wherein the two-stroke engine is disposed in a vehicle and is configured to provide propulsion of the vehicle.

8. The valve system of claim 1, wherein the valve member includes a first member configured to cover the intake port when the first member is in the closed position, and a second member configured to cover the exhaust port when the second member is in the closed position.

9. The valve system of claim 1, wherein the actuator is a mechanical actuator or an electro-mechanical actuator.

10. A two-stroke engine comprising:

a cylinder having a cylinder axis, the cylinder including a combustion chamber and a fluid port formed in a sidewall of the cylinder, the fluid port including at least one of an intake port and an exhaust port;

a piston configured to move within the cylinder along the cylinder axis during a power cycle between a first position in which a volume of the combustion chamber is at a maximum, and a second position in which the volume of the combustion chamber is at a minimum, the piston including a sealing ring configured to provide a fluid seal between the piston and the sidewall, the sealing ring configured to move along the cylinder axis with the piston and traverse the fluid port;

a valve member moveable along the cylinder axis and disposed in the cylinder between the piston and the sidewall, the valve member configured to be moved between an open position and a closed position, wherein the valve member covers the fluid port in the closed position; and an actuator configured to move the valve member in coordination with movement of the piston during a power cycle, so that the valve member is in the closed position as the piston traverses the fluid port, wherein the actuator is configured to move the valve member relative to the piston so that the sealing ring is prevented from engaging a boundary of the fluid port during the power cycle.

11. The two-stroke engine of claim 10, wherein the actuator is configured to move the valve member relative to the piston so that the sealing ring remains within the valve member as the sealing ring traverses the fluid port.

12. The two-stroke engine of claim 10, wherein the valve member is in the open position when the piston is in the first position, and the actuator is configured to move the valve member with the piston as the sealing ring traverses the fluid port, and maintain the valve member in the closed position as the sealing ring moves beyond the fluid port and the piston moves to the second position.

13. The two-stroke engine of claim 12, wherein the valve member is in the closed position when the piston is in the second position, and the actuator is configured to maintain the valve member in the closed position when the piston commences moving toward the first position, and move the valve member from the closed position toward the open position as the piston approaches the first position and as the sealing ring traverses the fluid port.

14. The two-stroke engine of claim 10, wherein the valve member is configured as a sleeve extending along a circumference of the cylinder, and the sleeve is configured to cover both the intake port and the exhaust port when the sleeve is in the closed position.

15. The two-stroke engine of claim 10, wherein the valve member includes a first member configured to cover the intake port when the first member is in the closed position, and a second member configured to cover the exhaust port when the second member is in the closed position.

16. A method of operating a two-stroke engine comprising:

providing a fuel mixture to a cylinder of the two-stroke engine, the cylinder having a cylinder axis, the cylinder including a combustion chamber and a fluid port formed in a sidewall of the cylinder, the piston including a sealing ring configured to provide a fluid seal between the piston and the sidewall, the sealing ring configured to move along the cylinder axis with the piston and traverse the fluid port, the fluid port including at least one of an intake port and an exhaust port, the cylinder enclosing a piston configured to move within the cylinder between a first position in which a volume of the combustion chamber is at a maximum, and a second position in which the volume of the combustion chamber is at a minimum;

moving the piston and the sealing ring along the cylinder axis between the first position and the second position during a power cycle; and moving a valve member along the cylinder axis in coordination with the piston, the valve member disposed in the cylinder between the piston and the sidewall and moveable between an open position and a closed position, wherein the valve member covers the fluid port in the closed position, the valve member is controlled so that the valve member is in the closed position as the piston traverses the fluid port, and the valve member is controlled so that the sealing ring is prevented from engaging a boundary of the fluid port during the power cycle.

17. The method of claim 16, wherein the valve member is formed from a single body.

18. The method of claim 17, wherein the valve member is in the open position when the piston is in the first position, and the valve member is moved with the piston as the sealing ring traverses the fluid port, and the valve member is maintained in the closed position as the sealing ring moves beyond the fluid port and the piston moves to the second position.

19. The method of claim 18, wherein the valve member is in the closed position when the piston is in the second position, the valve member is maintained in the closed position when the piston commences moving toward the first position, and the valve member is moved from the closed position toward the open position as the piston approaches the first position and as the sealing ring traverses the fluid port.

20. The method of claim 16, wherein the valve member is moved relative to the piston so that the sealing ring remains within the valve member as the sealing ring traverses the fluid port.

* * * * *